(12) United States Patent
Huberman et al.

(10) Patent No.: US 11,343,155 B2
(45) Date of Patent: *May 24, 2022

(54) MACHINE LEARNING ALGORITHMS FOR QUALITY OF SERVICE ASSURANCE IN NETWORK TRAFFIC

(71) Applicant: CABLE TELEVISION LABORATORIES, INC., Louisville, CO (US)

(72) Inventors: Bernardo Huberman, Palo Alto, CA (US); Scott H. Clearwater, Menlo Park, CA (US)

(73) Assignee: Cable Television Laboratories, Inc., Louisville, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/569,035

(22) Filed: Sep. 12, 2019

(65) Prior Publication Data
US 2020/0092176 A1 Mar. 19, 2020

Related U.S. Application Data

(60) Provisional application No. 62/856,615, filed on Jun. 3, 2019, provisional application No. 62/730,966, filed on Sep. 13, 2018.

(51) Int. Cl.
| | | |
|---|---|---|
| *H04L 41/147* | (2022.01) | |
| *H04L 43/067* | (2022.01) | |
| *H04L 41/16* | (2022.01) | |
| *G06F 17/18* | (2006.01) | |
| *H04L 43/0823* | (2022.01) | |
| *H04L 43/0882* | (2022.01) | |
| *H04L 43/106* | (2022.01) | |

(52) U.S. Cl.
CPC ............ *H04L 41/147* (2013.01); *G06F 17/18* (2013.01); *H04L 41/16* (2013.01); *H04L 43/067* (2013.01); *H04L 43/0847* (2013.01); *H04L 43/0882* (2013.01); *H04L 43/106* (2013.01)

(58) Field of Classification Search
CPC . H04L 41/147; H04L 47/127; H04L 43/0847; H04L 41/16; G06F 17/16; G06F 17/18; H04W 40/00; H04W 40/12; H04W 40/18; G06N 20/00
See application file for complete search history.

(56) References Cited

U.S. PATENT DOCUMENTS

| | | | |
|---|---|---|---|
| 6,807,527 B1 * | 10/2004 | Rozhdestvenskij | G10L 19/12 704/223 |
| 9,078,123 B1 * | 7/2015 | Benco | H04W 4/027 |
| 10,715,387 B1 | 7/2020 | Tutuianu et al. | |
| 2003/0113024 A1 * | 6/2003 | Feria | G06T 9/004 382/238 |
| 2009/0079586 A1 | 3/2009 | Bespalov et al. | |
| 2010/0232538 A1 * | 9/2010 | Watanabe | H04B 7/0626 375/267 |

(Continued)

*Primary Examiner* — David R Lazaro
*Assistant Examiner* — Xiang Yu
(74) *Attorney, Agent, or Firm* — David Daniel Smith (57) ABSTRACT

The present disclosure generally relates to apparatus, software and methods for predicting future network traffic. The disclosed apparatus, software and methods alleviate congestion and/or increase overall traffic flow by providing methods for reallocating future idle capacity.

19 Claims, 9 Drawing Sheets

(56) References Cited

U.S. PATENT DOCUMENTS

| | | |
|---|---|---|
| 2010/0246480 A1* | 9/2010 | Aggarwal ............. H04L 45/123 |
| | | 370/328 |
| 2014/0222997 A1 | 8/2014 | Mermoud et al. |
| 2018/0137412 A1 | 5/2018 | Nikkhah et al. |
| 2019/0028723 A1* | 1/2019 | Swaminathan ........ H04N 19/94 |
| 2019/0087737 A1* | 3/2019 | Pendar ................... G06F 17/18 |
| 2019/0325296 A1* | 10/2019 | Fowers ............... G06F 15/8053 |
| 2019/0379589 A1 | 12/2019 | Ryan et al. |
| 2020/0136975 A1* | 4/2020 | Arora .................... H04L 41/145 |
| 2020/0169895 A1* | 5/2020 | Chen .................... H04B 17/336 |
| 2020/0250032 A1* | 8/2020 | Goyal ................... G06F 3/0659 |

\* cited by examiner

MACHINE LEARNING ALGORITHMS FOR QUALITY OF SERVICE ASSURANCE IN NETWORK TRAFFIC

CROSS-REFERENCE TO RELATED APPLICATIONS

This application claims the benefit of and priority to U.S. Provisional Patent Application Nos. 62/730,966, filed Sep. 13, 2018, and 62/856,615, filed Jun. 3, 2019, each of which is hereby incorporated by reference in its entirety.

STATEMENT REGARDING FEDERALLY SPONSORED RESEARCH

None.

BACKGROUND

Digital content has become increasingly bandwidth intensive with the availability of streaming audio and/or video content, online interactive video games, network/Internet telephony and cloud-based storage. These activities, and others, have placed a high burden on existing data networks. New infrastructure is constantly being added to increase network capacity, but in order to keep apace with demand, efficiency of both wired and wireless networks is also a priority.

SUMMARY

The present disclosure generally relates to apparatus, software and methods for predicting future network traffic and/or optimizing transmission timing to alleviate congestion, improve service quality, and make efficient use of network capacity. The disclosed apparatus, software and methods achieve these objectives by predicting future network traffic and preemptively reallocating bandwidth to resources anticipated to have idle capacity and/or predicting the probability of successful transmission from a device connected to a common node and optimizing transmission timing to avoid collisions.

Locality sensitive hashing (LSH) has been applied in contexts outside the field of telecommunications. ("A neural algorithm for a fundamental computing problem" Sanjoy Dasgupta, Charles F. Stevens, Saket Navlakha, *Science* 10 Nov. 2017: Vol. 358, Issue 6364, pp. 793-796.) The present methods use historical traffic data and a neural-like variation of locality sensitive hashing (LSH) to group similar historical traffic patterns together. Each group of historic traffic patterns has associated with it a maximum traffic rate in some future time window. The group of future maximum traffic rates together define the probability distribution for maximum traffic for each historical traffic group, or cluster. The maximum traffic probability distribution is used in conjunction with a threshold quality of service (QoS) to reallocate any bandwidth available above the maximum traffic and threshold QoS levels. For example, if a traffic level less than the QoS threshold is 98% likely under the current conditions, then, with a probability of 98%, bandwidth above the threshold can be reallocated without a QoS violation. Stated another way, there is only a 2% chance of a QoS violation under the exemplary conditions.

In an aspect, a method of generating a future network traffic lookup table comprises: measuring network traffic volume at multiple points within a first time window to create a time series, each time series being associated with a measured future traffic rate within a second time window; multiplying the time series by a sparse, random binary matrix to obtain a vector of higher dimensionality than the time series; encoding the vector; and mapping the measured future traffic rate to the encoded vector within a lookup table.

In an aspect, a method for predicting future network traffic comprises: measuring network traffic volume at multiple points within a first time window to create a time series, each time series being associated with a measured future traffic rate within a second time window; multiplying the time series by a sparse, random binary matrix to obtain a vector of higher dimensionality than the time series; encoding the vector; mapping the measured future traffic rate to the encoding; repeating the steps of measuring, multiplying, encoding and mapping for different time windows to create a lookup table comprising a plurality of encodings and mappings; measuring, multiplying and encoding a current time series of network traffic; and matching the encoding for the current time series to one or more of the plurality of encodings within the lookup table.

In an embodiment, matching comprises identifying the closest encoding(s) to the encoding for the current time series within the lookup table when an identical match is not present. In an embodiment, identifying the closest encoding uses a similarity metric such as, but not limited to, Hamming distance, cosine similarity/difference or Minkowski distance.

In an embodiment, a method for predicting future network traffic further comprises forming a probability distribution of the measured future traffic rates for the closest encodings within the second time window.

In an embodiment, a method for predicting future network traffic further comprises predicting that a traffic rate of the current network traffic within a time period corresponding to the second time window will not exceed a specified statistical parameter of the probability distribution of the measured future traffic rates forming the probability distribution. For example, a specified statistical parameter of the probability distribution may be selected from the group consisting of a mean, median, average, mode, quantile, percentile and combinations thereof.

In an embodiment, a method of generating a future network traffic lookup table or a method for predicting future network traffic further comprises normalizing data within the time series. The step of normalizing typically occurs prior to multiplying the time series by a sparse, random binary matrix to obtain a vector of higher dimensionality than the normalized data. In an embodiment, the step of normalizing the data within the time series comprises dividing the network traffic volume at each of the multiple points by a value of the point in the time series measured last in the time. In an embodiment, the step of normalizing comprises dividing the network traffic volume at each of the multiple points by 1. In other words, the step of normalizing is optional.

In an embodiment, the step of encoding the vector sparsifies the data within the vector. In an embodiment, the step of encoding the vector uses a winner-take-all algorithm. In an embodiment, the step of encoding the vector comprises setting a portion of the highest values within the vector to 1 and all others to 0. In an embodiment, the portion of the highest values within the vector is the highest 70% of the values in the vector, or the highest 50% of the values in the vector, or the highest 30% of the values in the vector, or the highest 25% of the values in the vector, or the highest 20% of the values in the vector, or the highest 15% of the values in the vector, or the highest 10% of the values in the vector, or the highest 8% of the values in the vector, or the highest 5% of the values in the vector, or the highest 4% of the values in the vector, or the highest 3% of the values in the vector, or the highest 2% of the values in the vector, or the highest 1% of the values in the vector, or the highest 0.5% of the values in the vector.

In an embodiment, the future traffic rates are maximum traffic rates, minimum traffic rates, average traffic rates, mean traffic rates, quantile traffic rates or percentile traffic rates.

In an embodiment, a predicted future traffic rate is subtracted from a maximum network capacity to determine a future idle capacity during the second time window. For example, when the measured future traffic rate is a measured maximum future traffic rate, a predicted maximum future traffic rate can be subtracted from a maximum network capacity to determine a future idle capacity during the second time window.

In an embodiment, a method for predicting future network traffic further comprises reallocating at least a portion of a future idle capacity of the network.

In an embodiment, a method for predicting future network traffic further comprises ensuring a minimum quality of service is maintained when at least a portion of the future idle capacity of the network is reallocated. For example, ensuring a minimum quality of service may comprise assigning a quality of service threshold that sets or defines a minimum reliability.

In an embodiment, the first time window and the second time window are continuous or discontinuous and/or of equal duration or unequal duration relative to one another. However, the number of measurements and the measurement interval within each type of window must be the same for all samples contributing to a lookup table. For example, all first windows contributing to a lookup table must have the same number of measurements and measurement interval (e.g., 10 data points measured at 1 minute intervals), and all second windows contributing to the lookup table must have the same number of measurements and measurement interval (e.g., 20 data points measured every 20 seconds).

In an aspect, a non-transitory computer-readable medium has a plurality of non-transitory instructions executable with a processor to generate a future network traffic lookup table, the plurality of non-transitory instructions being executable for: measuring network traffic volume at multiple points within a first time window to create a time series, each time series being associated with a measured future traffic rate within a second time window; multiplying the time series by a sparse, random binary matrix to obtain a vector of higher dimensionality than the time series; encoding the vector; and mapping the measured future traffic rate to the encoded vector within a lookup table.

In an aspect, a non-transitory computer-readable medium has a plurality of non-transitory instructions executable with a processor to predict future network traffic, the plurality of non-transitory instructions being executable for: measuring network traffic volume at multiple points within a first time window to create a time series, each time series being associated with a measured future traffic rate within a second time window; multiplying the time series by a sparse, random binary matrix to obtain a vector of higher dimensionality than the time series; encoding the vector; mapping the measured future traffic rate to the encoding; repeating the steps of measuring, multiplying, encoding and mapping for different time windows to create a lookup table comprising a plurality of encodings and mappings; measuring, multiplying and encoding a current time series of network traffic; and matching the encoding for the current time series to one or more of the plurality of encodings within the lookup table.

In an embodiment, the plurality of non-transitory instructions are executable for forming a probability distribution of the measured future traffic rates for the closest encodings.

In an embodiment, the plurality of non-transitory instructions are executable for predicting that a traffic rate of the current network traffic within a time period corresponding to the second time window will not exceed a specified statistical parameter of the probability distribution of the measured future traffic rates forming the probability distribution.

In an embodiment, the plurality of non-transitory instructions are executable for determining a future idle capacity during the second time window when a predicted future traffic rate is subtracted from a maximum network capacity.

In an embodiment, the plurality of non-transitory instructions are executable for reallocating at least a portion of the future idle capacity of the network.

In an embodiment, the plurality of non-transitory instructions are executable for ensuring that a minimum quality of service is maintained when at least a portion of the future idle capacity of the network is reallocated.

In an embodiment, network traffic may be associated with a network channel, a hub, a wireless cell, a base station or a modem. In an embodiment, a network traffic signal may be selected from the group consisting of an electrical signal, a radio frequency signal, an optical signal and combinations thereof.

In an embodiment, those of skill in the art will appreciate that instead of predicting future network traffic the present apparatus, software and methods could be used to deduce a previous traffic rate by matching current network traffic to an earlier time window, for example, to explain why a problem arose.

In an aspect, a method for predicting a probability of successful transmission from a device connected to a common node comprises determining a state of each of a plurality of devices connected to a common node, the state comprising at least a time of transmission and whether an attempted transmission is successful or not; constructing a vector of the state of each device whenever any of the plurality of devices attempts to transmit to the common node; multiplying the vector by a sparse, random binary matrix to obtain an encoding; repeating the steps of determining, constructing, and multiplying to generate a lookup table of encodings; producing a current encoding by multiplying a vector for a current device state by the sparse, random binary matrix; matching the current encoding to one or more encodings in the lookup table; and providing a probability of successful transmission for the current encoding based on results of the attempted transmissions of the matching encoding(s).

In an embodiment, the time of transmission is a time of day or a time of transmission within a contention window.

In an embodiment, the attempted transmission is successful if a collision does not occur and unsuccessful if a collision occurs. In an embodiment, the attempted transmission is assigned a 0 if a collision occurs and a 1 if a collision does not occur.

In an embodiment, the state of each of a plurality of devices further comprises a quantity of data waiting to be transmitted.

In an embodiment, encoding the vector uses a winner-take-all algorithm.

In an embodiment, the step of matching comprises identifying the closest encoding(s) to the current encoding within the lookup table when an identical match is not present.

In an embodiment, the probability of successful transmission is used to optimize the time of transmission within at least a portion of the plurality of devices. In an embodiment, if the probability of a successful transmission is greater than a threshold, a contention window for each device producing a matching encoding is set equal to an aggregate contention window for all devices producing a matching encoding. For example, the aggregate contention window may be selected from the group consisting of a mean, median, average, mode, quantile or percentile of contention windows for all devices producing matching encodings.

In an embodiment, if the probability of a successful transmission is above a threshold, a transmission is routed immediately.

In an embodiment, optimizing the time of transmission comprises identifying the device within the plurality of devices with the greatest probability of successfully transmitting, and optionally, immediately routing a transmission to the identified device.

In an aspect, a non-transitory computer-readable medium has a plurality of non-transitory instructions executable with a processor for predicting a probability of successful transmission from a device connected to a common node, the plurality of non-transitory instructions being executable for: determining a state of each of a plurality of devices connected to a common node, the state comprising at least a time of transmission and whether an attempted transmission is successful or not; constructing a vector of the state of each device whenever any of the plurality of devices attempts to transmit to the common node; multiplying the vector by a sparse, random binary matrix to obtain an encoding; repeating the steps of determining, constructing, and multiplying to generate a lookup table of encodings; producing a current encoding by multiplying a vector for a current device state by the sparse, random binary matrix; matching the current encoding to one or more encodings in the lookup table; and providing a probability of successful transmission for the current encoding based on results of the attempted transmissions of the matching encoding(s).

In an embodiment, the plurality of non-transitory instructions are further executable for setting a contention window for each device that produces a matching encoding, the contention window equal to an aggregate contention window for all devices producing a matching encoding if the probability of a successful transmission is greater than a threshold.

In an embodiment, the plurality of non-transitory instructions are executable for routing a transmission immediately if the probability of a successful transmission is above a threshold.

In an embodiment, the plurality of non-transitory instructions are executable for identifying the device within the plurality of devices with the greatest probability of successfully transmitting, and optionally, immediately routing a transmission to the identified device.

In an embodiment, a method for predicting a probability of successful transmission from a device connected to a common node comprises: determining a state of each of a plurality of devices connected to a common node, the state comprising at least a time of transmission and whether an attempted transmission is successful or not; constructing a vector of the state of each device whenever any of the plurality of devices attempts to transmit to the common node; forming clusters of vectors; repeating the steps of determining, constructing, and forming to generate a lookup table of encodings; determining a probability distribution of successful transmissions for each cluster; matching a current device state vector to one of the clusters; and predicting that the current device has a statistical probability of successful transmission equal to a specified statistical parameter of the probability distribution for the one cluster.

In an aspect, a non-transitory computer-readable medium has a plurality of non-transitory instructions executable with a processor for predicting a probability of successful transmission from a device connected to a common node, the plurality of non-transitory instructions being executable for: determining a state of each of a plurality of devices connected to a common node, the state comprising at least a time of transmission and whether an attempted transmission is successful or not; constructing a vector of the state of each device whenever any of the plurality of devices attempts to transmit to the common node; forming clusters of vectors; repeating the steps of determining, constructing, and forming to generate a lookup table of encodings; determining a probability distribution of successful transmissions for each cluster; matching a current device state vector to one of the clusters; and predicting that the current device has a statistical probability of successful transmission equal to a specified statistical parameter of the probability distribution for the one cluster.

In an embodiment, the specified statistical parameter of the probability distribution is selected from the group consisting of a mean, median, average, mode, quantile, percentile and combinations thereof. In an embodiment, the step of matching current network traffic to one of the clusters uses a predictor algorithm.

In an embodiment, a clustering algorithm is used to form clusters of measured traffic histories. Clustering algorithms suitable for carrying out the clustering function are known. For example, a k-means algorithm, mean-shift clustering, Density-Based Spatial Clustering of Applications with Noise (DBSCAN), expectation maximization, and agglomerative hierarchical clustering can be used to form clusters of measured traffic histories. Although it would be possible to match current network traffic to a single measured traffic history, clusters comprising multiple measured traffic histories increase the sample size and improve the statistical accuracy of the data and of the prediction.

Clustering methods are described, for example, in U.S. patent application Ser. No. 16/522,167, filed Jul. 25, 2019, which is hereby incorporated by reference in its entirety.

BRIEF DESCRIPTION OF THE DRAWINGS

Illustrative embodiments of the present invention are described in detail below with reference to the attached drawings, wherein.

DETAILED DESCRIPTION

In general, the terms and phrases used herein have their art-recognized meaning, which can be found by reference to standard texts, journal references and contexts known to those skilled in the art. The following definitions are provided to clarify their specific use in the context of this description.

As used herein, the term "network" refers generally to any type of telecommunications or data network including, without limitation, hybrid fiber coaxial (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, LTE/LTE-A, WAP, SIP, UDP, FTP, RTP/RTCP, H.323, etc.).

As used herein, the term "channel" or "communication channel" refers to a physical transmission medium, such as a wire or optical cable, or a designated non-tangible broadcast medium, such as a wavelength used to convey an information signal from a sender(s) to a receiver(s). A channel has a certain capacity for transmitting information, often measured by its bandwidth in Hz or its data rate in bits per second.

As used herein, "contention" is a media access method used to share a broadcast medium. For example, in a network, two or more nodes may wish to transmit a message across the same wire at the same time, which would result in a collision. To reduce collisions, a user listens to the network to ensure the channel is free, then waits a random amount of time (designated a "contention window") before starting to transmit.

Disclosed herein are methods for predicting future network traffic and, optionally, reallocating network resources based on the prediction. The methods assume that users on the same network have access to and share the same group of communication channels, e.g., DOCSIS 3.0/3.1 channels, WDM wavelength channels, etc., and that traffic from these users merges at a common hub in the network.

The hub is any system (e.g., a cable modem termination system (CMTS)), device, software, or combination thereof, typically located in a cable company's hub site, or "head-end", which is used to provide high speed data services (i.e., the downstream transmissions), such as cable Internet and Voice over Internet Protocol. The channels are generally network bridges and modems that provide bi-directional data communication via radio frequency channels on a Hybrid Fiber-Coaxial (HFC) or Radio Frequency over Glass (RFoG). The channels are used to deliver broadband Internet access in the form of cable Internet, taking advantage of the high bandwidth of a HFC and RFoG network.

The hub is operable to configure the channels to communicate via a specific protocol (e.g., Data Over Cable Service Interface Specification, or "DOCSIS") specification. In this regard, the hub is operable to send control signals that direct the channels to operate in a particular manner with respect to the employed protocol. In an embodiment, the hub is operable to specify one or more channels for transmitting and/or receiving data from a network user or group of network users. As such, network bandwidth may be reallocated at the hub by redirecting traffic from a congested channel to one or more idle channels.

Figure 1A:
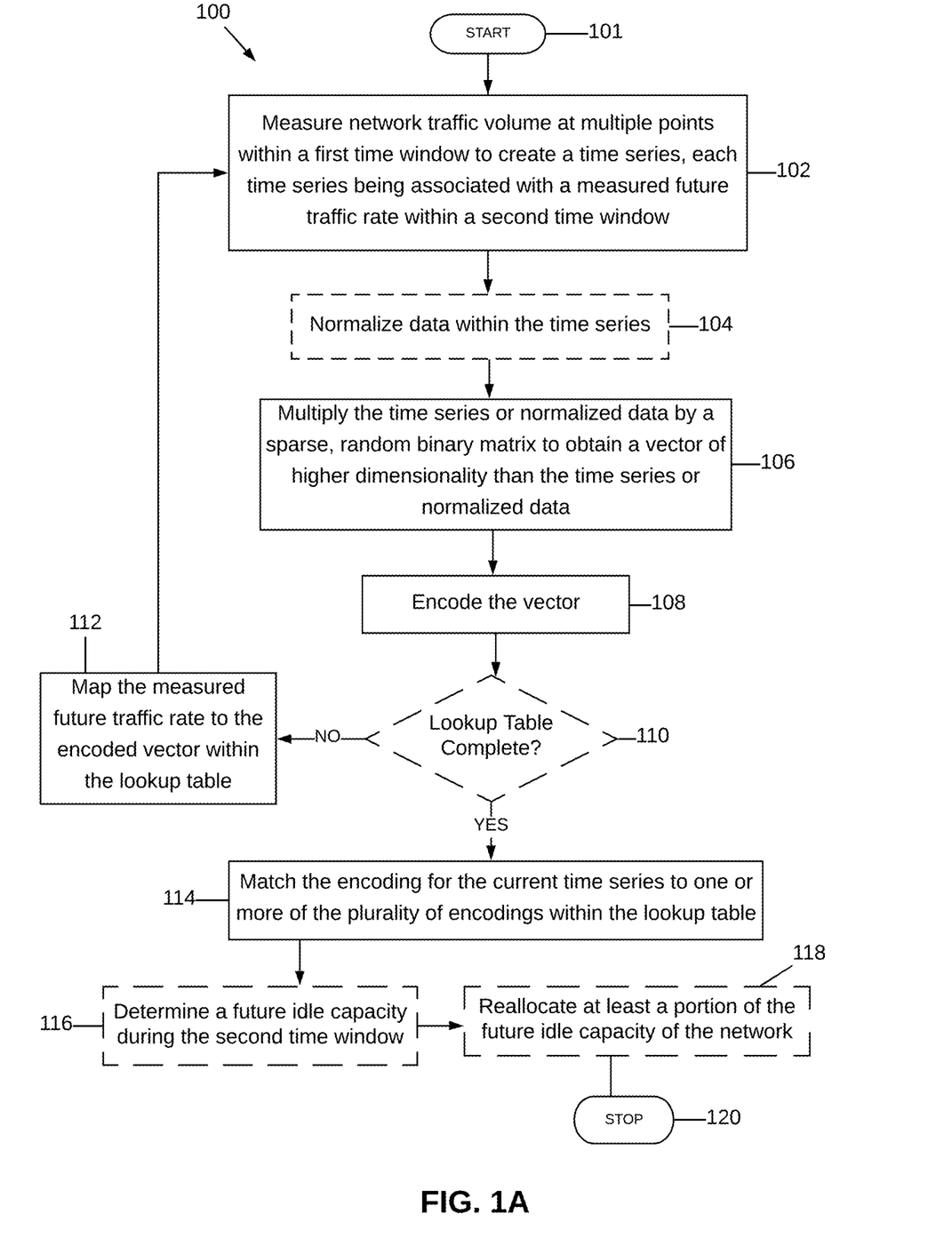
FIG. 1A is a flowchart illustrating steps in a method of generating a future network traffic lookup table that may be used to predict future network traffic, according to multiple embodiments.

FIG. 1A is a flowchart 100 illustrating steps in a method of generating a future network traffic lookup table that may be used to predict future network traffic. The method begins with step 101. In step 102, network traffic volume is measured at multiple points within a first time window to create a time series. Each time series is associated with a measured future traffic rate within a second time window. In optional step 104, data within the time series is normalized. The time series or normalized data is then multiplied by a sparse, random binary matrix to obtain a vector of higher dimensionality than the time series or normalized data, in step 106. In step 108, the vector is encoded. An optional query asks whether the lookup table is complete, in step 110. If the lookup table has not been fully constructed, the measured future traffic rate is mapped to the encoded vector within the lookup table and steps 102-110 are repeated until the lookup table is completed. Once the lookup table is complete, the encoding for the current time series is matched to one or more of the plurality of encodings within the lookup table, in step 114. In optional step 116, the future idle capacity during the second time window is determined, and at least a portion of the future idle capacity of the network may be reallocated in step 118. The method ends with step 120.

As an extension to the methods disclosed herein, since the methods predict the next period likelihood of transmitting continuously, and the ground truth value of the previous period is available, the ground truth value can be used as a feedback to correct for systematic errors. This can be done with a boost factor, which is multiplied to the likelihoods and increased when under-predicting and decreased when over-predicting the total number of transmitters.

As an extension to the methods disclosed herein, a moving historical window may track changes in the system over time. For example, a method may automatically exclude data before a specified time or date range or a method may use only the most recent specified number of data points, thereby automatically adjusting for systematic changes in the system over time.

A further extension of the methods described above can be used to set a contention window based on the predicted future traffic. According to the extension, instead of predicting an absolute load on each transmitter, the likelihood of transmitting above a threshold is predicted. Then, to estimate the number of active transmitters in a second time window these likelihoods are summed across all transmitters and rounded to the nearest integer.

Figure 1B:
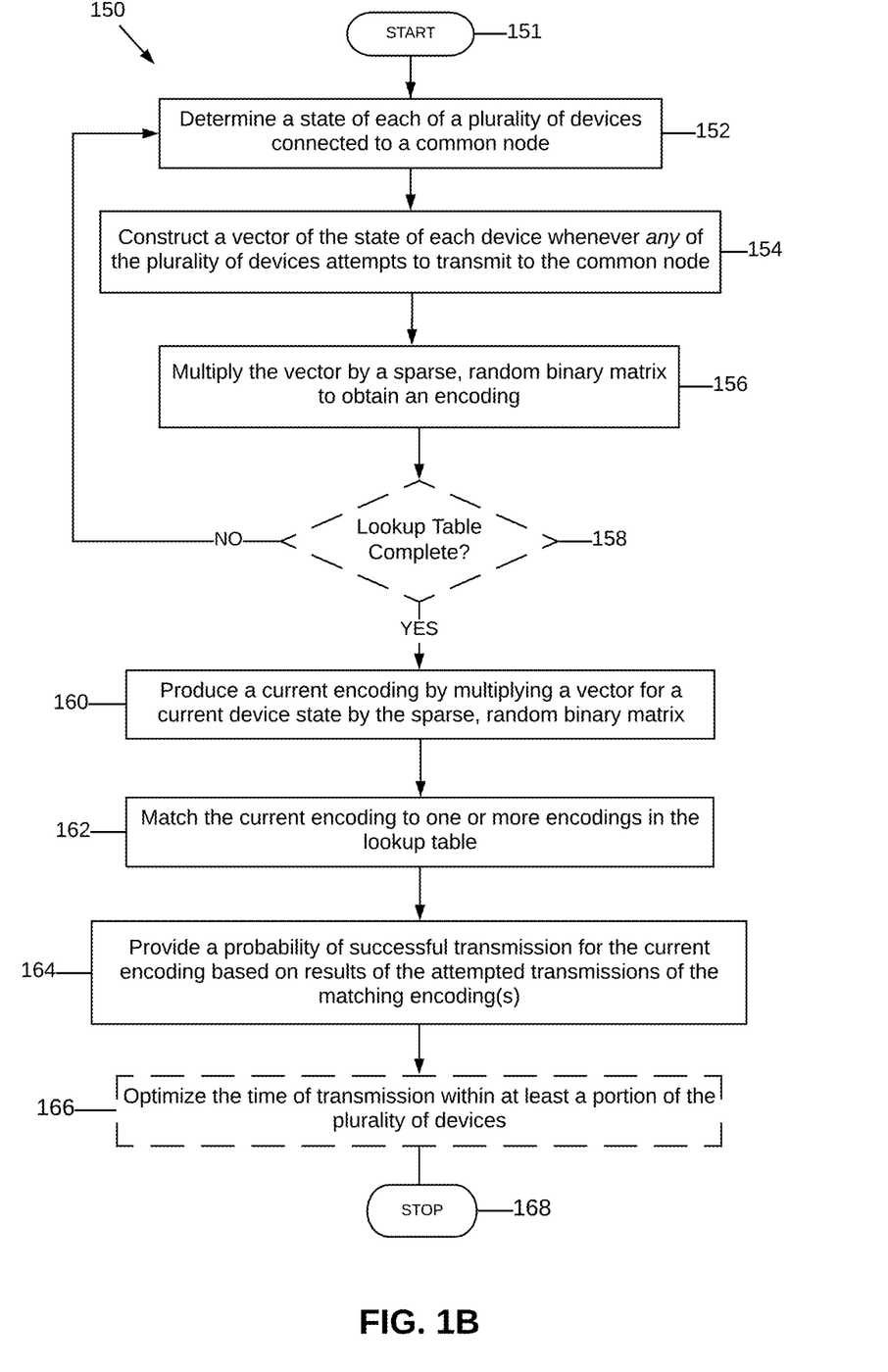
FIG. 1B a flowchart illustrating steps in a method for predicting a probability of successful transmission from a device connected to a common node, according to multiple embodiments.

FIG. 1B a flowchart 150 illustrating steps in a method for predicting a probability of successful transmission from a device connected to a common node. The method begins with step 151. In step 152, a state of each of a plurality of devices connected to a common node is determined. For example, the state of a device may comprise a time of transmission, either in absolute time or within a contention window, whether an attempted transmission is successful or not, a quantity of data waiting to be transmitted, and the like. In step 154, a vector of the state of each device is constructed whenever any of the plurality of devices attempts to transmit to the common node. In step 156, the vector is multiplied by a sparse, random binary matrix to obtain an encoding. An optional query asks whether the lookup table is complete, in step 158. If the lookup table has not been fully constructed, steps 152-158 are repeated until the lookup table is completed. Once the lookup table is complete, a current encoding is produced by multiplying a vector for a current device state by the sparse, random binary matrix, in step 160, and the current encoding is matched to one or more encodings in the lookup table, in step 162. In step 164, a probability of successful transmission for the current encoding is provided based on results of the attempted transmissions of the matching encoding(s). In optional step 166, the time of transmission within at least a portion of the plurality of devices is optimized. If step 166 is not performed, the method ends with step 168.

Figure 1C:
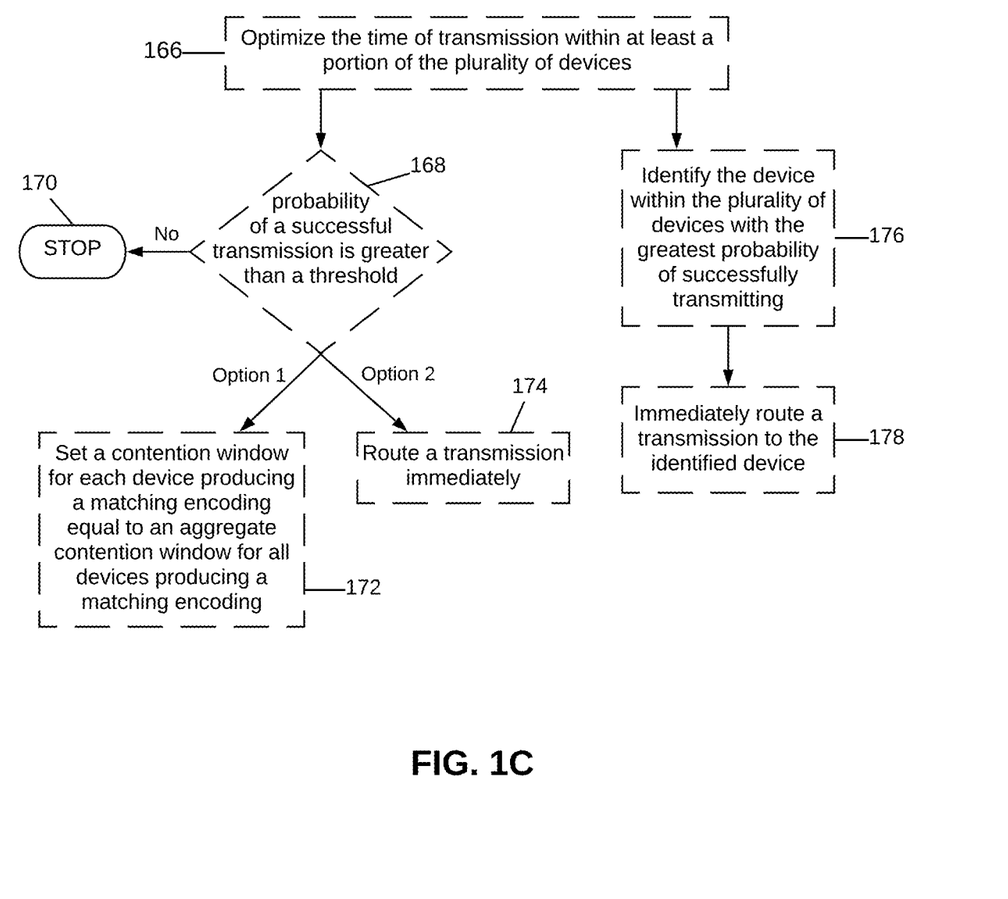
FIG. 1C is a flowchart providing greater detail for the step of optimizing the time of transmission shown in FIG. 1B.

FIG. 1C is a flowchart providing greater detail for step 166 from FIG. 1B, which optimizes the time of transmission. Query 168 asks whether the probability of a successful transmission for the current encoding is greater than a threshold. If the answer is "no", optimization is not carried out and the method ends with step 170. However, if the answer is "yes", two options exist. In step 172, a contention window for each device producing a matching encoding can be set equal to an aggregate contention window for all devices producing a matching encoding. This ensures that all devices producing a matching encoding are using an optimized contention window. In step 174, a transmission is routed immediately with the expectation that the transmission will have a probability at or above the threshold limit of not experiencing a collision. As an alternative to steps 168-174, optimization of the time of transmission may be based on identifying the device within the plurality of devices with the greatest probability of successfully transmitting (step 176), and immediately routing a transmission to the identified device, in step 178.

Figure 2:
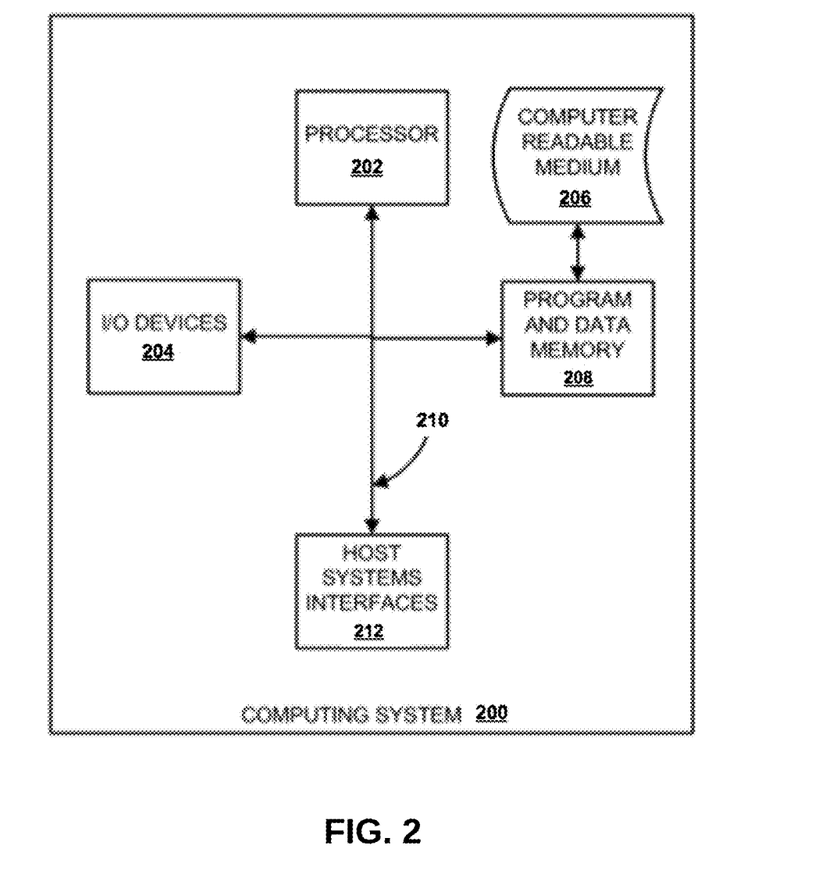
FIG. 2 is a block diagram of an exemplary computing system in which a computer readable medium provides instructions for performing methods described herein.

The embodiments herein may be implemented in a variety of ways as a matter of design choice. For example software and processors performing CMTS functions could be configured in a hub or a headend facility, and the physical layer functions could be in programmable hardware in the node. In this regard, the invention can take the form of an entirely hardware embodiment, an entirely software embodiment or an embodiment containing both hardware and software elements. In an embodiment, the invention is implemented in software, which includes but is not limited to firmware, resident software, microcode, etc. FIG. 2 illustrates a computing system 200 in which a computer readable medium 206 may provide instructions for performing any of the methods disclosed herein.

Furthermore, the invention can take the form of a computer program product accessible from the computer readable medium 206 providing program code for use by or in connection with a computer or any instruction execution system. For the purposes of this description, the computer readable medium 206 can be any apparatus that can tangibly store the program for use by or in connection with the instruction execution system, apparatus, or device, including the computer system 200.

The medium 206 can be any tangible electronic, magnetic, optical, electromagnetic, infrared, or semiconductor system (or apparatus or device). Examples of a computer readable medium 206 include a semiconductor or solid state memory, magnetic tape, a removable computer diskette, a random access memory (RAM), a read-only memory (ROM), a rigid magnetic disk and an optical disk. Some examples of optical disks include compact disk-read only memory (CD-ROM), compact disk-read/write (CD-R/W) and DVD.

The computing system 200, suitable for storing and/or executing program code, can include one or more processors 202 coupled directly or indirectly to memory 208 through a system bus 210. The memory 208 can include local memory employed during actual execution of the program code, bulk storage, and cache memories which provide temporary storage of at least some program code in order to reduce the number of times code is retrieved from bulk storage during execution. Input/output (I/O) devices 204 (including but not limited to keyboards, displays, pointing devices, etc.) can be coupled to the system either directly or through intervening I/O controllers. Network adapters may also be coupled to the system to enable the computing system 200 to become coupled to other data processing systems, such as through host systems interfaces 212, or remote printers or storage devices through intervening private or public networks. Modems, cable modems and Ethernet cards are just a few of the currently available types of network adapters.

The apparatus, software and methods disclosed herein are further illustrated by the following Examples. These Examples are for illustrative purposes only and are not intended to limit the inventions.

Example 1

This example uses a novel algorithm, outlined in the following steps, to accurately predict future network traffic.

1) Input a time series of network traffic, T, of length t, in this case from an aggregation of devices, although the method can also be applied to individual devices as well, although much more data will be needed in such cases (see below). The values T are optionally normalized by the latest value in the time series. The importance of which is to reduce the number of possible patterns as will be illustrated below.

2) Multiply input vector by a sparse random binary matrix (p=0.1 for a 1, else 0), R, with dimension t×40 t which yields a vector V of length 40 t. In other words, T×R=V. Note that this step creates an increase from the dimensionality of the input.

3) Take the top 4% of values V and set those values to 1 and all other values to 0, creating a winner-take-all representation, W(V)=E. This represents the encoding of the input pattern, T, in 1). Thus, E is not only larger in dimension than the input but is also sparser. The point of the rounding is to reduce the number of possible encodings which allows multiple time series to be mapped to the same encoding.

4) Save the relevant look-ahead data, L, for T which can be of any desired length and create a lookup table from the encoding E in 3). Note that the encoding is a one-to-many mapping, so in general, $E(T)=\{L_i\}$ 5) Repeat 1)-4), for example by stepping T forward, to create a large library of encodings and mappings, $\{E_i\} \rightarrow \{\ldots, \{L_i\}, \ldots\}$ 6) Given a new time series, $\tau$, apply the same random matrix, R, in 2) to generate a new pattern, $\tau \times R = V_\tau$.

7) Convert the pattern $V_\tau$ into its winner-take-all form a la 3), namely, $W(V_\tau)=E_\tau$ and check if it matches an existing encoding, i.e. if $E_\tau \cap \{E_i\} \neq \emptyset$, go to 9), 8) Else find the closest $n_e$ encoded mappings by distance to $V_\tau$. That is, find the $n_e$ $\min(H(\{E_\tau, E_i\})=\{E_{min}\}$. $n_e$ should be chosen so that $n_e << \|\{E\}\|$, the number of encodings.

9) Use the lookup table of future outcomes, $\{L_\tau\}_{min}$, from the closest encodings $\{E_\tau\}_{min}$ to form a cumulative distribution function for the traffic, CDF. CDF, in turn, is related to the quality-of-service and traffic level, θ, via, QoS=CDF $[\theta_\tau, \{L_\tau\}_{min}]$, which gives the probability of a particular traffic level given a set of encodings being less than QoS.

10) Find the traffic prediction by inverting the equation in 9): $\theta_\tau = CDF^{-1}[QoS, QoS, \{L_\tau\}_{min}]$. In other words, find the traffic level from the cumulative distribution of encoded look aheads that corresponds to the quality-of-service (QoS).

Figure 3:
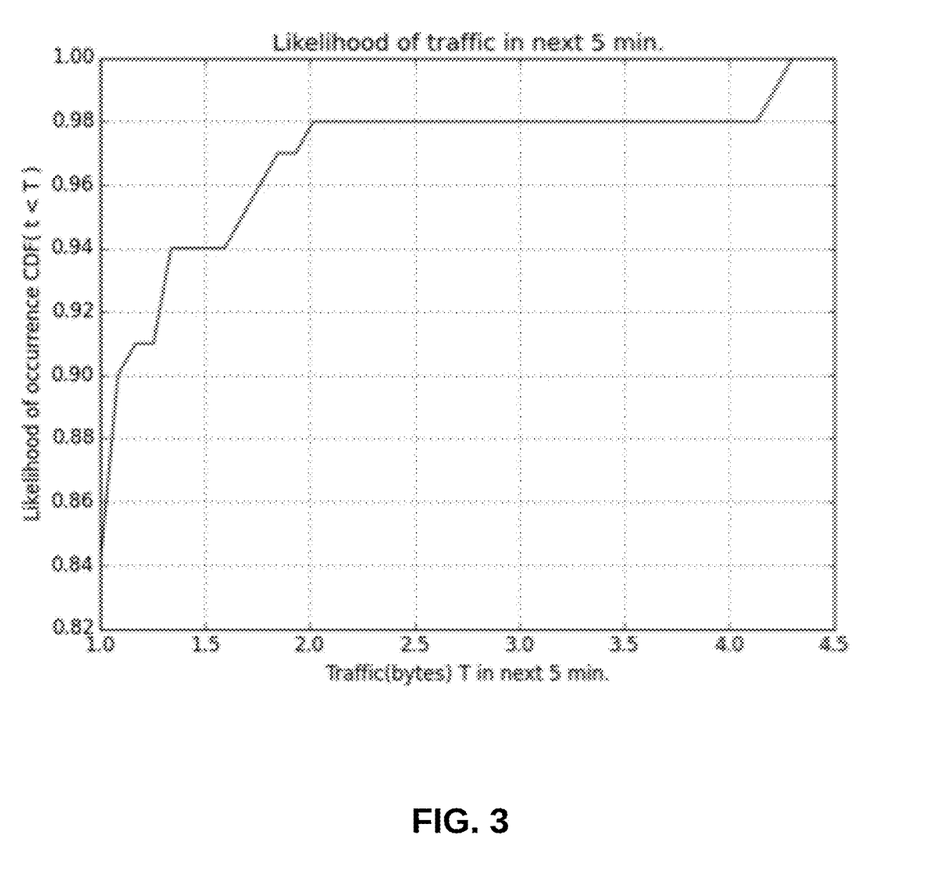
FIG. 3 is a Cumulative Distribution Function (CDF) of normalized future traffic used for prediction, according to an embodiment.

An example of this procedure is described with reference to FIG. 3, which shows a Cumulative Distribution Function (CDF) of normalized future traffic used for prediction. To use this distribution, one takes the desired QoS (y-axis) and reads horizontally across the plot until one reaches the curve. The normalized traffic corresponding to that QoS is then found by dropping down vertically to the x-axis. For example, for a QoS of 90% (remembering that QoS here is the percentile of the largest traffic in the matched patterns), an amount 1.1 times the current traffic rate should be allocated to accommodate the largest traffic rate in the next 5 minutes.

Results

Aggregated Devices

This section reports the results of using this new algorithm on aggregated traffic from many devices. Training time series were formed from time-series of duration 60-minutes, stepped forward in 5-minute increments. The total number of training time series was over 30,000 corresponding to about 21 days of training. Next, the traffic maxima were predicted using time series occurring after the training time series corresponding to 2.5 days of testing.

Figure 4:
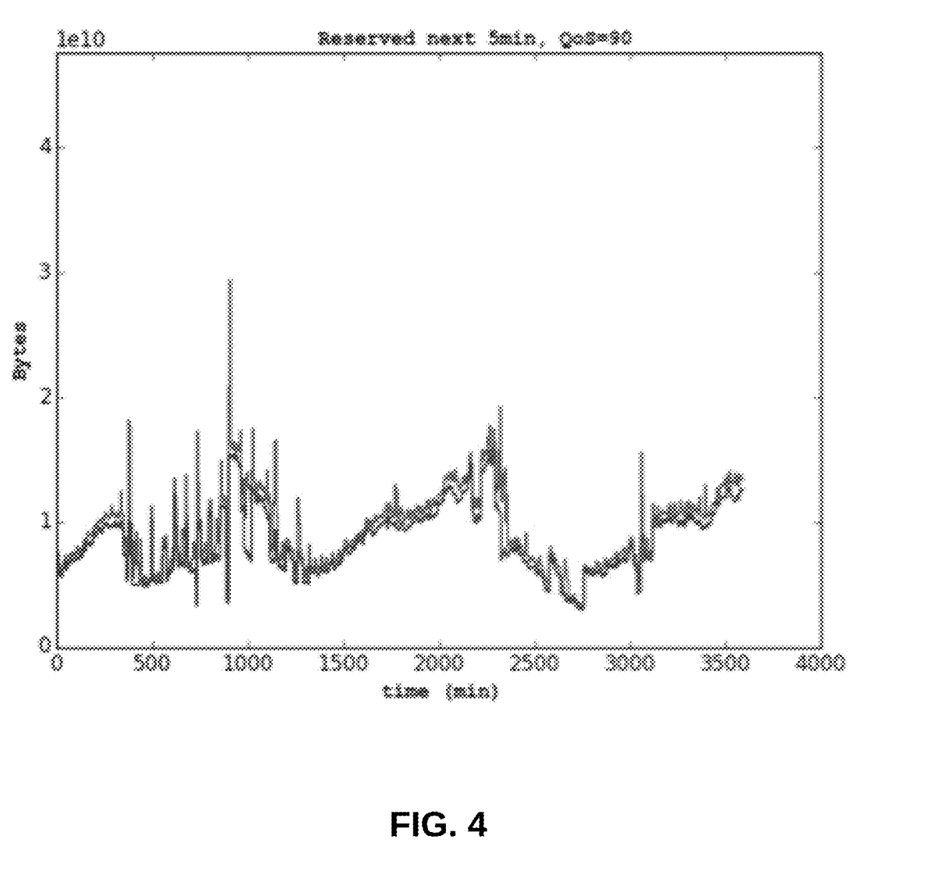
FIG. 4 is a graph of maximum traffic over 5-minute windows for actual aggregated devices (darker, lower line) and predicted traffic (lighter, upper line), according to an embodiment.

The results are shown in FIG. 4, which is a graph of actual maximum traffic over 5-minute windows for aggregated devices (darker, lower line) and predicted traffic (lighter, upper line) in minutes using a QoS of 90%. Note that the "QoS" is actually calculated from the maximum traffic size over a 5-minute window, so it is the percentile of an already extreme value which accounts for the 90% QoS nearly always exceeding the actual traffic maximum, rather than only 90% of the time.

As can be seen, the predictions are quite good. Because of the enormous number of combinations in the encoding $(2400!/(120!*2280!) \approx \times 10^{205})$, step 7) was never used and only the top approximations in step 8), with $n_e=100$, were used. Overall, about 2% of the over 30,000 patterns were used in the predictions.

Individual Devices

Figure 5A:
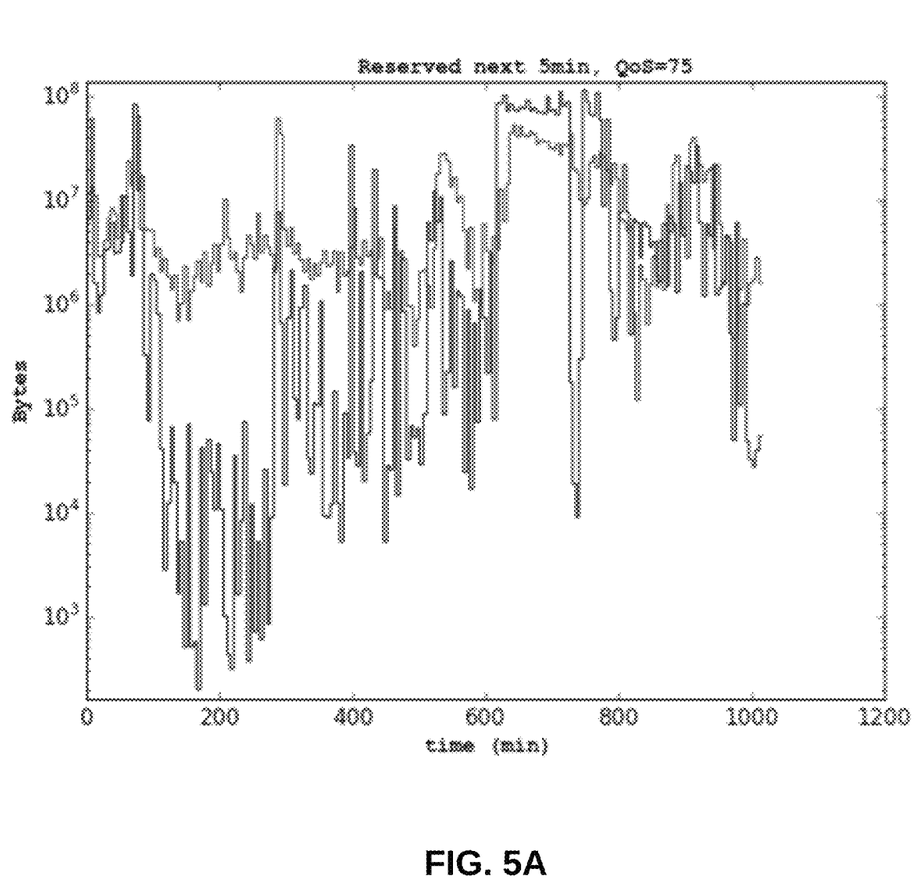
FIGS. 5A, 5B and 5C are graphs of maximum traffic over 5-minute windows for an actual individual device (darker, lower line) and predicted traffic (lighter, upper line) in minutes for several values of QoS, according to an embodiment.
Figure 5B:
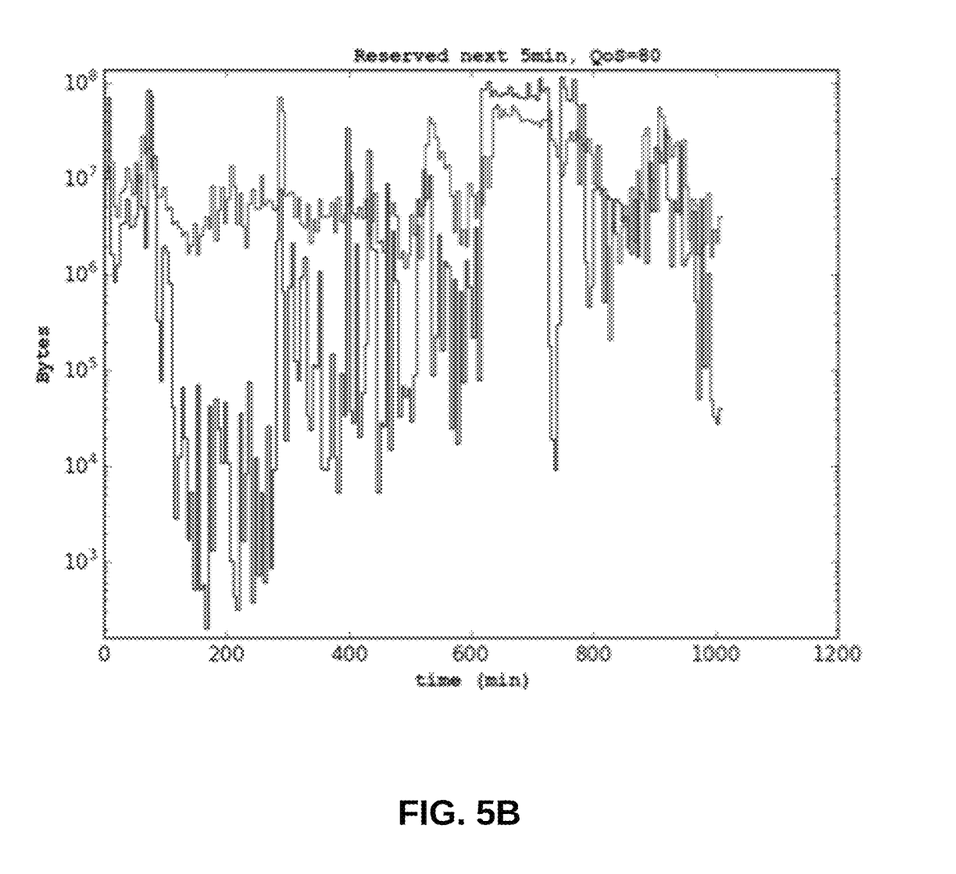
Figure 5C:
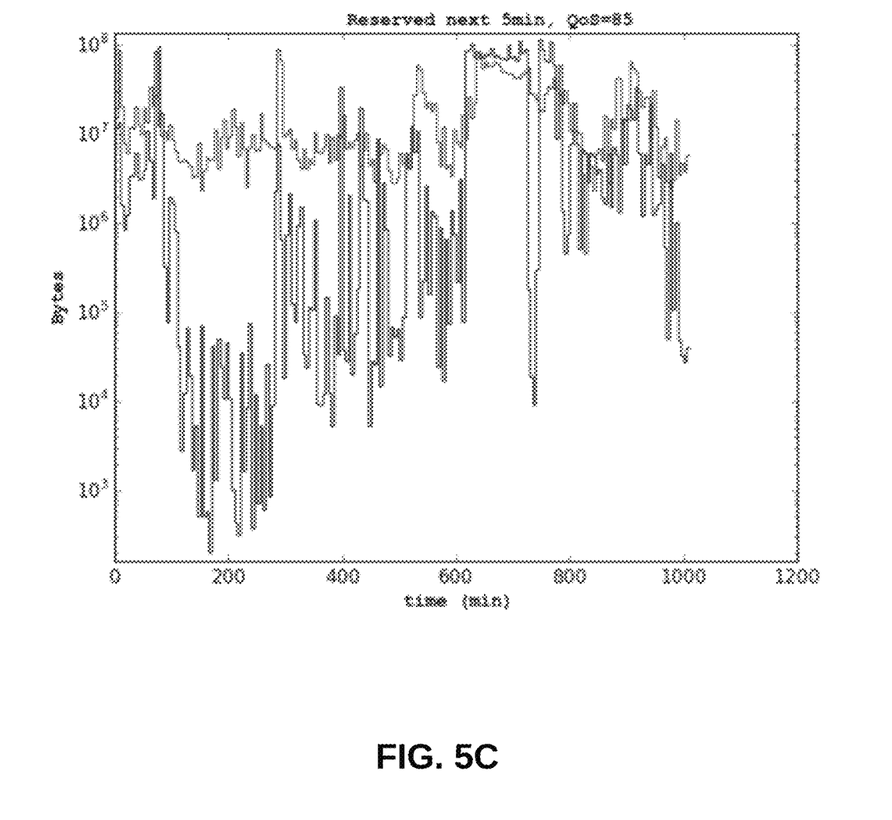

This section reports the results of a single high-volume device. In the case of individual devices, even fairly busy ones, the range of traffic can vary over 7 orders of magnitude as shown in FIGS. 5A, 5B and 5C. Due to this large variation, the data were not normalized, and absolute values of traffic were used in the clustering procedure. Training data took place over 45 days.

FIGS. 5A, 5B and 5C are graphs of maximum traffic over 5-minute windows for an individual device (darker, lower line) and predicted traffic (lighter, upper line) in minutes for QoS 75%, 80% and 85%, respectively.

Because of the huge variation in traffic rates on a single device, the predictions for low volume traffic were off by a fair amount. With many more low traffic examples it should be possible to better track individual pattern of use.

Example 2

This example reports on how a contention window (CW) can be predicted given a history of prior device states and whether a collision occurred or not. The method used for this prediction is based on a locality sensitive hashing (LSH) algorithm that combines a random binary projection with a winner-take-all sparsification to create a hash for each input pattern. Each input pattern has a consequent output, e.g., collision or no-collision. The key behind this approach is that similar hashes will produce similar output states.

Consider a collection of wireless devices sending to a common node.

1) For every attempted transmission by one of these nodes, collect the state of the node.

2) Each node has a state of its queue (how many bytes awaiting transmission), its current contention window (measured in seconds), and whether the transmission resulted in a collision or was successful.

This will result in a set of vectors and associated collision or not outputs for each device d at time t.

$\{[b_t, cw_t, \ldots]\}_d \rightarrow \{T_t\}_d$ (0=collision, 1=successful transmission) for every time that the device d attempts to transmit at time t.

Now construct a vector that is the state of each device at each transmit time of any device. Since we are collecting the data at each transmission time there is also a record of how the transmission worked out.

Thus, for each transmission attempt we have a vector of the state of the nodes and the transmission result.

$$V(t) = \{\{[b_t, cw_t, \ldots]\}_d, \ldots\} \rightarrow T(t).$$

To use LSH in this application, multiply V by a random binary matrix, R, to create an encoding, E.

$$W(V \times R) = E$$

where W is the winner-take-all sparsifying operator.

Each encoding, in turn, corresponds to one or more transmission states, $\{T\}_E$.

Use of LSH in Contention Window Sizing 1) given the current state $V_c$ multiply by R and apply W to find the current encoding $E_c$.

2) find the n closest encodings to $E_c$, $\{E_i\}$ and take the average of all the $\{T\}_{\{E\}}$ for each device, d, to get the set of probabilities of a successful transmission by device, $\{p_d\}$.

3) if max($p_d$)>threshold then set $CW_d$=avg($CW_{\{E\}}$)

4) go to 1)

Use of LSH in Transmission Timing

We now explore an alternative to using contention windows at all. That is, when the probability of a successful transmission is above a threshold, then transmit immediately. To use this procedure in practice:

1) given the current state $V_c$ multiply by R and apply W to find the current encoding $E_c$.

2) find the n closest encodings to $E_c$, $\{E_i\}$ and take the average of all the $\{T\}_{\{E\}}$ for each device, d, to get the set of probabilities of a successful transmission by device, $\{p_d\}$.

3) if max($p_d$>threshold then choose the device with the greatest probability of a successful transmission and route the transmission to the selected device 4) go to 1)

To the extent that similar device state encodings map to similar transmission states, this method will allow for a high probability of achieving a successful transmission.

STATEMENTS REGARDING INCORPORATION BY REFERENCE AND VARIATIONS

All references cited throughout this application, for example patent documents including issued or granted patents or equivalents; patent application publications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the invention has been specifically disclosed by preferred embodiments, exemplary embodiments and optional features, modification and variation of the concepts herein disclosed can be resorted to by those skilled in the art, and that such modifications and variations are considered to be within the scope of this invention as defined by the appended claims. The specific embodiments provided herein are examples of useful embodiments of the invention and it will be apparent to one skilled in the art that the invention can be carried out using a large number of variations of the devices, device components, and method steps set forth in the present description. As will be apparent to one of skill in the art, methods, software and apparatus/devices can include a large number of optional elements and steps. All art-known functional equivalents of materials and methods are intended to be included in this disclosure. Nothing herein is to be construed as an admission that the invention is not entitled to antedate such disclosure by virtue of prior invention.

When a group of substituents is disclosed herein, it is understood that all individual members of that group and all subgroups are disclosed separately. When a Markush group or other grouping is used herein, all individual members of the group and all combinations and subcombinations possible of the group are intended to be individually included in the disclosure.

It must be noted that as used herein and in the appended claims, the singular forms "a", "an", and "the" include plural reference unless the context clearly dictates otherwise. Thus, for example, reference to "a processor" includes a plurality of such processors and equivalents thereof known to those skilled in the art, and so forth. As well, the terms "a" (or "an"), "one or more" and "at least one" can be used interchangeably herein. It is also to be noted that the terms "comprising", "including", and "having" can be used interchangeably. The expression "of any of claims XX-YY" (wherein XX and YY refer to claim numbers) is intended to provide a multiple dependent claim in the alternative form, and in some embodiments is interchangeable with the expression "as in any one of claims XX-YY."

Unless defined otherwise, all technical and scientific terms used herein have the same meanings as commonly understood by one of ordinary skill in the art to which this invention belongs. Although any methods and materials similar or equivalent to those described herein can be used in the practice or testing of the present invention, the preferred methods and materials are described.

Whenever a range is given in the specification, for example, a range of integers, a temperature range, a time range, a composition range, or concentration range, all intermediate ranges and subranges, as well as all individual values included in the ranges given are intended to be included in the disclosure. As used herein, ranges specifically include the values provided as endpoint values of the range. As used herein, ranges specifically include all the integer values of the range. For example, a range of 1 to 100 specifically includes the end point values of 1 and 100. It will be understood that any subranges or individual values in a range or subrange that are included in the description herein can be excluded from the claims herein.

As used herein, "comprising" is synonymous and can be used interchangeably with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein any of the terms "comprising", "consisting essentially of" and "consisting of" can be replaced with either of the other two terms. The invention illustratively described herein suitably can be practiced in the absence of any element or elements, limitation or limitations which is/are not specifically disclosed herein.

What is claimed is:

1. A method for predicting a probability of successful transmission from a device connected to a common node comprising:

determining a state of each of a plurality of devices connected to a common node, the state comprising at least a time of transmission and whether an attempted transmission is successful or not;

constructing a 1×d input vector of the state of each device, d, whenever any of the plurality of devices attempts to transmit to the common node;

multiplying the input vector by a d×nd sparse, random binary matrix, where n is an integer greater than 1, to obtain a second vector;

encoding the second vector using a sparsifying operator;

repeating the steps of determining, constructing, multiplying, and encoding to generate a lookup table of encodings;

producing a current encoding by repeating the steps of multiplying and encoding on an input vector for a current device state;

matching the current encoding to one or more encodings in the lookup table;

providing a probability of successful transmission for the current encoding based on results of the attempted transmissions of the matching encoding(s); and using the probability of successful transmission to schedule an upcoming time of transmission for at least a portion of the plurality of devices.

2. The method of claim 1, wherein the time of transmission is a time of day or a time of transmission within a contention window.

3. The method of claim 1, wherein the attempted transmission is successful if a collision does not occur and unsuccessful if a collision occurs.

4. The method of claim 1, wherein the state of each of a plurality of devices further comprises a quantity of data waiting to be transmitted.

5. The method of claim 1, wherein encoding the second vector uses a winner-take-all algorithm.

6. The method of claim 1, wherein the step of matching comprises identifying the closest encoding(s) to the current encoding within the lookup table when an identical match is not present.

7. The method of claim 1, wherein if the probability of a successful transmission is greater than a threshold, a contention window for each device producing a matching encoding is set equal to an aggregate contention window for all devices producing a matching encoding.

8. The method of claim 7, wherein the aggregate contention window is selected from the group consisting of a mean, median, average, mode, quantile or percentile of contention windows for all devices producing matching encodings.

9. The method of claim 1, wherein if the probability of a successful transmission is above a threshold, a transmission is routed immediately.

10. The method of claim 1 further comprising identifying the device within the plurality of devices with the greatest probability of successfully transmitting.

11. The method of claim 10 further comprising immediately routing a transmission to the identified device.

12. A non-transitory computer-readable medium having a plurality of non-transitory instructions executable with a processor for predicting a probability of successful transmission from a device connected to a common node, the plurality of non-transitory instructions being executable for:
   determining a state of each of a plurality of devices connected to a common node, the state comprising at least a time of transmission and whether an attempted transmission is successful or not;
   constructing a 1×d input vector of the state of each device, d, whenever any of the plurality of devices attempts to transmit to the common node;
   multiplying the input vector by a d×nd sparse, random binary matrix, where n is an integer greater than 1, to obtain a second vector;
   encoding the second vector using a sparsifying operator;
   repeating the steps of determining, constructing, multiplying, and encoding to generate a lookup table of encodings;
   producing a current encoding by repeating the steps of multiplying and encoding on an input vector for a current device state;
   matching the current encoding to one or more encodings in the lookup table;
   providing a probability of successful transmission for the current encoding based on results of the attempted transmissions of the matching encoding(s); and
   using the probability of successful transmission to schedule an upcoming time of transmission for at least a portion of the plurality of devices.

13. The non-transitory computer-readable medium of claim 12, wherein the matching comprises identifying the closest encoding(s) to the current encoding within the lookup table when an identical match is not present.

14. The non-transitory computer-readable medium of claim 12, wherein the time of transmission is a time of day or a time of transmission within a contention window.

15. The non-transitory computer-readable medium of claim 12 further comprising the plurality of non-transitory instructions being executable for setting a contention window for each device producing a matching encoding equal to an aggregate contention window for all devices producing a matching encoding if the probability of a successful transmission is greater than a threshold.

16. The non-transitory computer-readable medium of claim 15, wherein the aggregate contention window is selected from the group consisting of a mean, median, average, mode, quantile or percentile of contention windows for all devices producing matching encodings.

17. The non-transitory computer-readable medium of claim 12 further comprising the plurality of non-transitory instructions being executable for routing a transmission immediately if the probability of a successful transmission is above a threshold.

18. The non-transitory computer-readable medium of claim 12 further comprising the plurality of non-transitory instructions being executable for identifying the device within the plurality of devices with the greatest probability of successfully transmitting.

19. The non-transitory computer-readable medium of claim 18 further comprising the plurality of non-transitory instructions being executable for immediately routing a transmission to the identified device.

* * * * *